C. P. Morton,
Circular Sawing Machine,
N° 28,005. Patented Apr. 24, 1860.
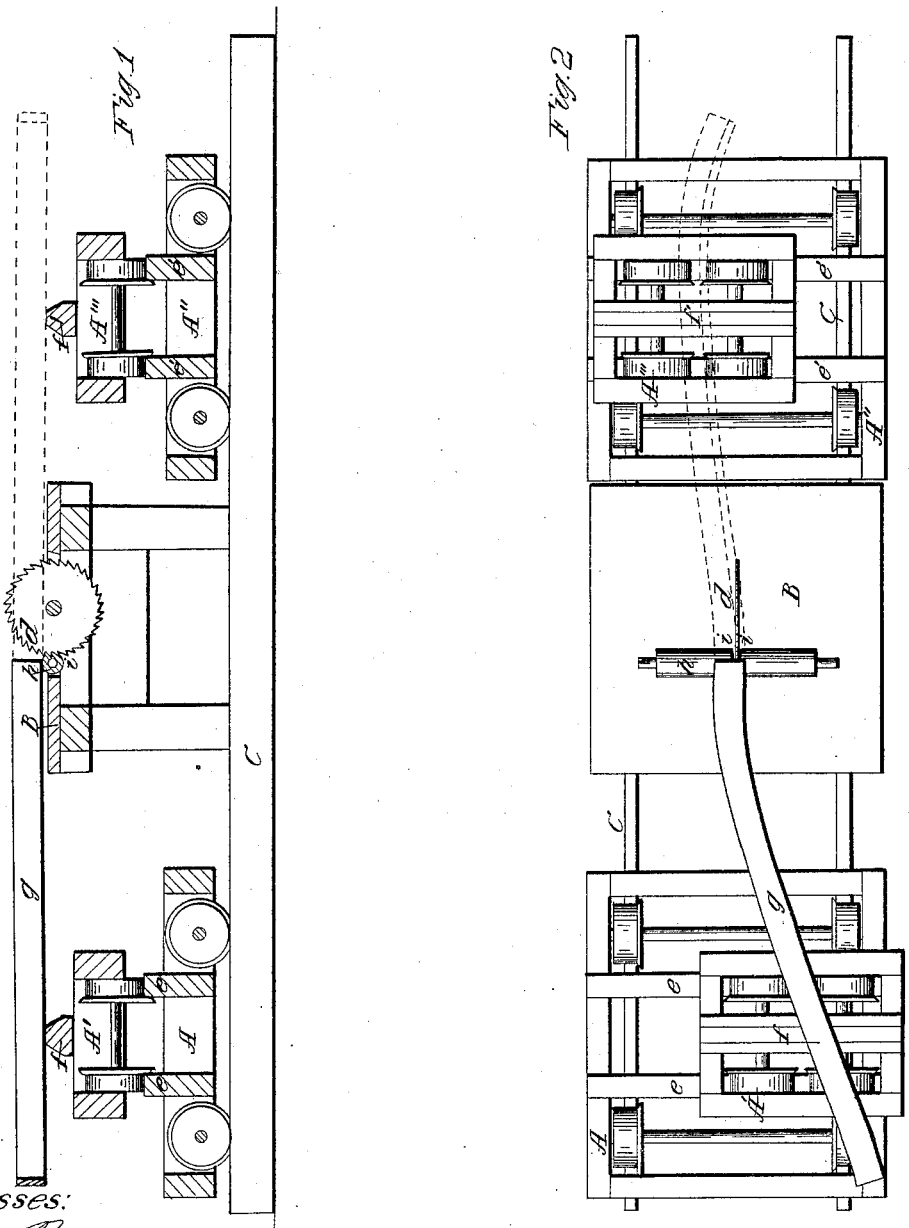
Witnesses:
Benj. Morton
George Pfeiffer
Inventor:
C. P. Morton

UNITED STATES PATENT OFFICE.

C. P. MORTON, OF PHILADELPHIA, PENNSYLVANIA.

SAWMILL.

Specification of Letters Patent No. 28,005, dated April 24, 1860.

*To all whom it may concern:*

Be it known that I, C. P. MORTON, of the city of Philadelphia and State of Pennsylvania, have invented a new and Improved Apparatus for Feeding Curved or Ship Timber to Saws; and I do hereby declare that the following is a full, clear, and exact description of the construction and operation of the same, reference being had to the annexed drawings, making a part of this specification, in which—

Figure 1 represents a vertical longitudinal section, and Fig. 2, a plan view of the same.

Like letters, when on the different figures, indicate the same parts.

The nature of invention consists in the general arrangement, in relation to each other and to the saw, of two sets of double trucks upon track-rails in front and rear of the saw, and a friction roller to serve both as a support and a center of motion to the timber, near the teeth of the saw, as hereinafter described; whereby a more simple, cheap, easily understood and managed apparatus is produced for giving the required lateral motions to the timber, by hand, in sawing ship and other curved timber.

In the drawings A, A', and A'' A''', represent the trucks or carriages; B, the saw frame, and C, C, the track rails extending both in front and rear of the said frame. The saw-frame (B) in this instance is adapted for a circular saw $d$; but a vertically reciprocating saw, will be equally applicable, in a suitable frame, for the purpose. The track-rails (C, C,) extend horizontally in the usual parallel manner, both in front and rear of the stationary frame (B); and the trucks (A and A'') are respectively placed thereon so as to traverse backward and forward along their respective portions of the track—each carrying its respective secondary truck (A'', A''',). The said secondary trucks (A'', A''',) are each adapted to traverse upon the track-rails $e\ e$ and $e'\ e'$, respectively, which are fixed upon the main trucks (A and A'') at right angles to the line of motion of the same. The said secondary trucks (A', A''',) have each a bed-block $f$, $f'$, fixed longitudinally along in the middle of the upper side of the frame of the same, so as to project sufficiently, above the frame of the said truck, to keep the timber $g$, which is to be sawed, clear of the said frame, and also so as to be nearly in the same horizontal plane with the upper side of the friction roller $h$.

The friction roller ($h$) projects, about one-third of its diameter, above the plane of its support, and is placed with its shaft across and almost in contact with the teeth of the saw ($d$) it being recessed at the part, $i$, opposite the saw, for the purpose, or so as to bring the upper side of the said roller as near to the teeth of the saw as possible.

Operation: The trucks (A and A'') each having a free motion along on the track rails (C, C,) at their respective sides of the saw frame, and the secondary trucks (A' A''') having each a free motion on their respective track-rails ($e\ e$ and $e'\ e'$) on the trucks (A and A'') at right angles to the main-track rails (C, C), it is evident that, if a curved piece of timber ($g$) be placed so as to rest firmly both upon the roller ($h$) in front of the saw and upon the bed-block ($f$), it can readily be fed to the said saw so as to be cut in the line of the curve, or with the grain of the wood, by simply moving the trucks A and A'', by hand, accordingly; and that when the center of equilibrium of the said timber ($g$) has been thus passed over the roller ($h$) its forward end will rest upon the bed block $f'$, and be supported by the adjustable trucks A' and A''', as indicated by the dotted lines in the figures, and by means of which the said timber can be guided, as before, for the remainder of the cut, the roller ($h$), in both cases, serving as a center of motion near the teeth of the saw, in so operating or guiding the stick of timber ($g$).

This is an exceedingly simple and effective hand apparatus for feeding curved, or ship, timber to saws, and moveover it is easily managed or operated by one person, and is not liable to derangement.

Having thus fully described my improved apparatus, and pointed out its utility, what I claim as new therein of my invention, and desire to secure by Letters Patent, is—

The arrangement of the trucks, A, A', and A'', A''', respectively, with each other and with the track rails C C, and roller $h$, in relation to the saw $d$, as set forth; the same operating together in the manner and for the purpose described.

C. P. MORTON.

Witnesses:
BENJ. MORISON,
JNO. B. KENNEY.